United States Patent [19]

Inomata

[11] Patent Number: 5,061,740

[45] Date of Patent: Oct. 29, 1991

[54] ORGANOPOLYSILOXANE COMPOSITION AND PROCESS FOR PREPARING THE SAME

[75] Inventor: Hiroshi Inomata, Takasaki, Japan

[73] Assignee: Shin-Etsu Chemical Co., Ltd., Tokyo, Japan

[21] Appl. No.: 458,425

[22] Filed: Dec. 28, 1989

[30] Foreign Application Priority Data

Dec. 28, 1988 [JP] Japan .............................. 63-332527
Dec. 28, 1988 [JP] Japan .............................. 63-332528

[51] Int. Cl.$^5$ ................................................ C08K 9/06
[52] U.S. Cl. .................................. 523/213; 523/212; 524/588
[58] Field of Search ................. 523/212, 213; 524/588

[56] References Cited

U.S. PATENT DOCUMENTS 4,116,919 9/1978 Elias et al. ........................ 523/213
4,469,522 9/1984 Matsumoto ........................ 523/213
4,529,774 7/1985 Evans et al. ..................... 523/213
4,929,391 5/1990 Kroupa ............................. 524/262

*Primary Examiner*—Paul R. Michl
*Assistant Examiner*—Karen A. Hellender
*Attorney, Agent, or Firm*—Oblon, Spivak, McClelland, Maier & Neustadt

[57] ABSTRACT

An organopolysiloxane composition comprising an organopolysiloxane and compounded therein a silica fine powder treated with a silazane compound containing a group represented by the following formula:

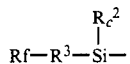

wherein Rf represents a fluorine-containing organic group; $R^2$ represents a monovalent hydrocarbon group containing no fluorine atom; $R^3$ represents a divalent hydrocarbon group; and c is an integer of 0, 1 or 2. The composition has superior release properties and transparency.

12 Claims, No Drawings

ORGANOPOLYSILOXANE COMPOSITION AND PROCESS FOR PREPARING THE SAME

BACKGROUND OF THE INVENTION

1. Field of the Invention

This invention relates to an organopolysiloxane composition comprising fluorosilicone-treated silica compounded therein, and also relates to a process for preparing the composition.

2. Description of the Prior Art

Silica fine powder is compounded into organopolysiloxane compositions such as silicone rubbers, silicone greases, and silicone oil compounds, for the purpose of controlling fluidity, reinforcing mechanical strength, improving release properties or adhesion, and also improving compression set, thermal resistance and chemical resistance.

Silica fine powders used for such purpose include fumed silica and wet-processed silica. These silica fine powders, however, all have a number of silanol groups on their particle surfaces. Hence, the compounding of such silica fine powder into organopolysiloxane as it is may cause the pseudo-crosslinking called structuring or creep hardening, during the storage of the resulting compositions. This may result in an extreme lowering of the fluidity or consistency of the compositions, bringing about the problem of plasticization reversion occurring in an excessively great extent particularly in the case of rubber compositions.

Under such circumstances, it has been hitherto attempted to use surface-treated silica, obtained by applying surface treatment to the above silica fine powders so that the silanol groups on the particle surfaces are hindered by silylation, thereby avoiding the above problems.

Methods for such surface treatment of silica fine powder are known to include a method in which silica fine powder is reacted with chlorosilane or a silazane compound, and a method in which silica fine powder and silicone rubber are kneaded and thereafter the above silazane compound, or a dialkylsilanediol, an alkoxysilane or the like is added to carry out reaction.

The release properties and transparency, however, have been unsatisfactory in the above organopolysiloxane compositions in which the conventional surface-treated silica is compounded.

SUMMARY OF THE INVENTION

Accordingly, an object of this invention is to provide an organopolysiloxane composition that has prevented the pseudo-crosslinking from occurring during its storage and also has superior release properties and transparency, and a process for preparing such a composition.

This invention provides an organopolysiloxane composition comprising:

(A) an organopolysiloxane represented by the general formula (I):

wherein $R^1$ represents a monovalent hydrocarbon group having 1 to 10 carbon atoms and containing no fluorine atom; and a is a numeral of 1.90 to 3.0, and b is a numeral of 0 to 1.0, provided that a+b is 1.90 to 3.0, and (B) a fluorosilicone-treated silica; wherein said (B) fluorosilicone-treated silica is obtained by reacting:

(B-1) a silica fine powder of not less than 50 m$^2$/g in specific surface area with (B-2) a silazane compound of not more than 3,000 in molecular weight, containing a group represented by the following formula (II):

wherein Rf represents a fluorine-containing organic group having a perfluoroalkyl ether group, or a perfluoroalkyl group; $R^2$ represents a monovalent hydrocarbon group having 1 to 10 carbon atoms and containing no fluorine atom; $R^3$ represents a divalent hydrocarbon group having 2 to 10 carbon atoms; and c is an integer of 0, 1 or 2.

This invention also provides a process for preparing an organopolysiloxane composition, comprising the step of mixing or kneading the (A) organopolysiloxane, the (B-1) silica fine powder, the (B-2) silazane compound, and (C) water.

This invention still also provides a process for preparing a fluorosilicone-treated silica, comprising the step of reacting the (B-1) silica fine powder with the (B-2) silazane compound.

DETAILED DESCRIPTION OF THE INVENTION

(A) Organopolysiloxane

In the organopolysiloxane composition of this invention, the organopolysiloxane used as the base component is represented by the general formula (I) as set out above, i.e.:

In the general formula (I), the group $R^1$ represents a monovalent hydrocarbon group having 1 to 10 carbon atoms and containing no fluorine atom, which includes, for example, alkyl groups such as a methyl group, an ethyl group, and a propyl group; aliphatic or alicyclic unsaturated hydrocarbon groups such as a vinyl group, an allyl group, a cyclopentenyl group, or a hexenyl group; aromatic hydrocarbon groups such as a tolyl group and a xylyl group; and substituted hydrocarbon groups such as a chloroethyl group, a chloropropyl group, a cyanoethyl group, and a methoxyethyl group. The a is a numeral of from 1.90 to 3.0, and preferably from 1.96 to 2.40, and the b is a numeral of from 0 to 1.0, and preferably from 0 to 0.40, provided that a+b is from 1.90 to 3.0, and preferably from 1.96 to 2.40.

This organopolysiloxane have usually a degree of polymerization, of not more than 10,000, and may include those of a liquid state with a low viscosity and those of a rubbery state. In particular, the organopolysiloxane may preferably have a viscosity of from 500 to 100,000 cSt (at 25° C.) when a liquid silicone rubber composition is obtained.

Examples of this organopolysiloxane are those respectively represented by the following formulas:

HO⫟SiO⫠ₐH, CH₃ | CH₂=CHSiO⫟SiO⫠ₑ⫟SiO⫠ᵢSiCH=CH₂, with CH₃ groups and phenyl groups HO⫟SiO⫠ᵍ⫟SiO⫠ₕH, with CH₃ and phenyl (CH₂=CH)₃SiO⫟SiO⫠ᵢ⫟SiO⫠ⱼSi(CH=CH₂)₃, with CH₃ and phenyl HO⫟SiO⫠ₖ⫟SiO⫠ₗH, with CH₃ and CH=CH₂

(CH₃)₃SiO⫟SiO⫠ₘ⫟SiO⫠ₙSi(CH₃)₃, with CH₃ and CH₂CH₂CN (CH₃)₃SiO⫟SiO⫠ₘSi(CH₃)₃, with CH₃

H₂NC₃H₆—SiO⫟SiO⫠ₚ⫟SiO⫠qSi—C₃H₆NH₂, with CH₃ groups and phenyl

In the formulas, e, f, g, h, i, j, k, l, m, n, p and q each represent 0 or a positive integer.

These organopolysiloxanes can be prepared in an industrial scale by known methods. For example, they can be prepared by subjecting a cyclic siloxane such as cyclotrisiloxane or cyclotetrasiloxane, represented by the formula:

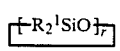

wherein $R^1$ is the same as defined in the above general formula (I), and r is, for example, 3 to 8 and triorganodisilixane or a trace amount of water, to equilibration reaction or ring-opening reaction in the presence of an acid or alkali catalyst.

(B) Fluorosilicone-treated Silica

In this invention, the fluorosilicone-treated silica is used in combination with the above base component (A) organopolysiloxane. The use of such treated silica enables effective suppression of the pseudo-crosslinking during the storage of the resulting compositions, and also brings about excellency in the release properties and transparency of the compositions.

Such fluorosilicone-treated silica can be obtained by reacting the (B-1) silica fine powder of not less than 50 m²/g in specific surface area, with the (B-2) silazane compound of not more than 3,000 in molecular weight, containing a group represented by the formula (II) previously set out.

(B-1) Silica fine powder:

The silica fine powder used in preparing the fluorosilicone-treated silica is a silica fine powder of 50 m²/g, and preferably not less than 100 m²/g, in specific surface area. It includes, for example, treated silica such as fumed silica, and wet silica. In particular, silica fine powders of from 200 to 400 m²/g in specific surface area are preferred in order to obtain a silicone rubber having a tear propagation strength high enough for the organopolysiloxane compositions. A specific surface area of less than 50 m²/g, of the silica fine powder used makes it impossible to obtain sufficient reinforcement effect even if it is compounded into the silicone rubber. Examples of this silica fine powder include Aerosil 130, 200, 300, 380, available from Degussa, Inc.; MS-5, MS-7, available from Cabot Corp.; and Nipsil VN-3, LP, E220, A-330, available from Nippon Silica Industrial Co., Ltd.

(B-2) Silazane compound:

The silazane compound used in the treatment of the above (B-1) silica fine powder is not more than 3,000, and preferably not more than 1,000, in molecular weight. Use of a silazane compound of more than 3,000 in molecular weight may result in a lowering of the reactivity because of its steric hindrance, bringing about unsatisfactory silylation of the silanol groups on the particle surfaces of the silica fine powder, or making it difficult to remove an unreacted silazane compound or its decomposition by-product. This may sometimes cause difficulties.

In this invention, among silazane compounds of not more than 3,000 in molecular weight, those containing the group represented by the above formula (II), i.e.:

is used, in particular.

In the formula (II), the group $R^2$ represents a monovalent hydrocarbon group having 1 to 10 carbon atoms and containing no fluorine atom, specifically including the same groups as those exemplified for the group $R^1$ in the formula (I) previously set out. The c is an integer of 0, 1 or 2.

The group $R^3$ represents a divalent hydrocarbon group having 2 to 10 carbon atoms, including, for example, an ethylene group, an ethylidene group, a trimethylene group, a phenylethylene group, and a group represented by the formula:

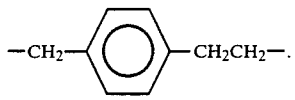

The group Rf represents a fluorine-containing organic group having a perfluoroalkyl ether group, or a perfluoroalkyl group. Herein, the above fluorine-containing organic group includes fluorine-containing organic groups having 3 to 15 carbon atoms and containing a perfluoroalkyl ether group represented by the following formula:

$$F\text{—}(\text{—}C_qF_{2q}O\text{—})_n\text{—}$$

wherein q is an integer of 1 to 3, and n is an integer of 1 to 4. It more specifically includes, for example, groups represented by the following formulas:

$$C_mF_{2m+1}(CH_2)_rO\text{—}$$

wherein m is an integer of 1 to 3, and r is an integer of 0 to 2,

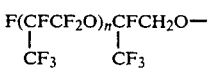

wherein n is an integer of 1 to 4.

The perfluoroalkyl group is exemplified by a group represented by the following formula:

$$C_pF_{2p+1}$$

wherein p is an integer of 4 to 12.

Preferred examples of the group Rf that represents the above fluorine-containing organic group or perfluoroalkyl group include, for example, the groups represented by the following formulas: $C_6F_{13}$—, $C_8F_{17}$—, $C_{10}F_{21}$,

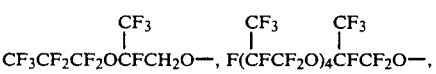

$F(CF_2CF_2CF_2O)_2CF_2CF_2CH_2O$—, and $CF_3CF_2O(CF_2CF_2O)_2CF_2OCF_2CF_2O$.

Examples of the silazane compound containing the group represented by the formula (II) include the following:

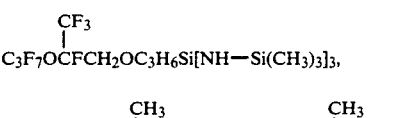

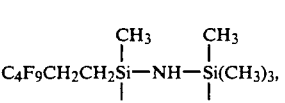

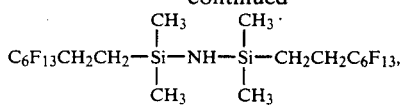

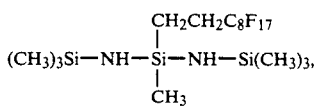

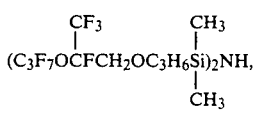

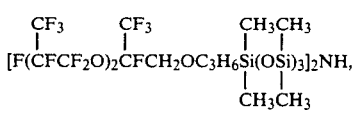

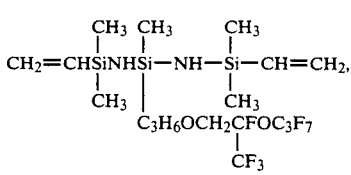

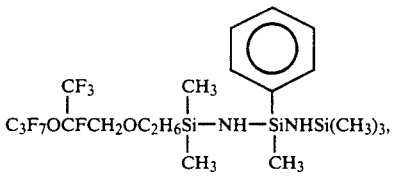

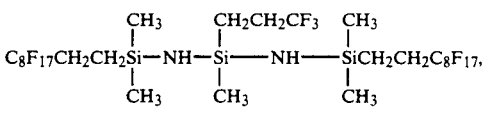

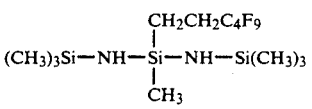

The above silazane compounds may be used alone or in combination of two or more kinds.

The above silazane compounds may also be used in combination with a silazane compound having no fluorine-containing organic group, represented by the formula: $[(CH_3)_3Si]_2NH$, or $[CH_2=CH(CH_3)_2Si]_2NH$, so long as the object of improving the release properties or transparency as aimed in this invention may not be missed. In this instance, generally speaking, the silazane compound containing the group represented by the above formula (II) should be used in an amount of not less than 1 part by weight based on 100 parts by weight of the silazane compound having no fluorine-containing organic group.

The silazane compound used in this invention can be obtained in the form of a single substance or a mixture by, for example;

dissolving the corresponding chlorosilane in a chlorinated solvent or fluorinated solvent as exemplified by methylene chloride, dichloroethane, trichloroethane, trichlorotrifluoroethane, and methaxylene fluoride;

blowing ammonia gas into the resulting solution to cause reaction; and removing the ammonium chloride produced, by filtration or by washing with an aqueous alkaline solution such as an aqueous sodium hydroxide solution or an aqueous potassium hydroxide solution, followed by purification by distillation or the like.

Preparation of fluorosilicone-treated silica:

The fluorosilicone-treated silica used in this invention can be readily obtained by reacting the above (B-1) silica fine powder with the (B-2) silazane compound.

The reaction may be carried out by, for example;

dropwise adding or spray-adding the (B-2) silazane compound in the (B-1) silica fine powder with stirring to cause the reaction to proceed while allowing ammonia gas to liberate; and after aging for several hours to several days, removing decomposition by-products such as ammonia, silanol and polysiloxane and an unreacted silazane compound, to give the desired fluorosilicone-treated silica.

The above reaction is usually accompanied with gentle generation of heat, and also can proceed even at room temperature. The reaction, however, can be accelerated by heating the reaction mixture to an appropriate temperature, usually 200° C. or less, so that the reaction time can be shortened even to not more than 2 hours, for example.

In preparing this fluorosilicone-treated silica, the silazane compound may be used in an amount of from 1 to 200 parts by weight, and preferably from 10 to 50 parts by weight, based on 100 parts by weight of the silica fine powder. Use of the silazane compound in an amount less than 1 part by weight may result in insufficient silylation of the particle surfaces of the silica fine powder, and use thereof in an amount more than 200 parts by weight makes products expensive or makes it necessary to provide considerable processing or treatment steps for removing unreacted materials or decomposition by-products after completion of the reaction, thus bringing about economical disadvantages.

In preparing the fluorosilicone-treated silica as described above, water may preferably be dropwise added or spray-added before the addition of the silazane compound so that the silanol groups on the particle surfaces of the silica fine powder can be well reacted with the silazane compound to achieve sufficient silylation of the silanol groups. This water has the action of accelerating the reaction between the silica fine powder and silazane compound to promote the silylation of the silanol groups on the particle surfaces of the silica fine powder. Use of water with a temperature higher than room temperature can also accelerate the decomposition of the silazane compound and also accelerate the evaporation of ammonia, thus bringing about advantages. This water may be used in an amount of not more than 50 parts by weight, and preferably from 2 to 20 parts by weight, based on 100 parts by weight of the silica fine powder. Use of the water in an amount more than 50 parts by weight requires much time and energy for the removal of the water that remains after completion of the reaction, thus bringing about economical disadvantages.

A wetting agent may further be used for the purpose of wetting the particle surfaces of the silica fine powder used and also attaining sufficient reaction between the silica fine powder and silazane compound. This wetting agent may preferably be not more than 3,800, and particularly not more than 1,000, in molecular weight.

This wetting agent includes, for example, the compounds represented by the following formulas:

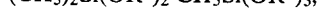

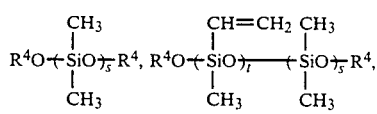

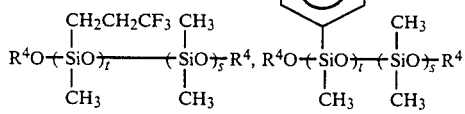

wherein $R^4$ represents a hydrogen atom or a monovalent hydrocarbon group having 1 to 4 carbon atoms, as exemplified by a methyl group, an ethyl group, a propyl group or a methoxyethyl group; and s and t are positive integers.

The wetting agent may preferably be used in an amount of usually not more than 30 parts by weight, and particularly not more than 10 parts by weight, based on 100 parts by weight of the silica fine powder.

PREPARATION OF ORGANOPOLYSILOXANE COMPOSITIONS

The organopolysiloxane composition of this invention can be prepared by compounding from 1 to 100 parts by weight, and particularly from 10 to 50 parts by weight, of the component (B) fluorosilicone-treated silica in 100 parts by weight of the component (A) organopolysiloxane previously described. As another method, it is also possible to prepare the organopolysiloxane composition at the same time the component (B) fluorosilicone-treated silica is formed by mixing or kneading the above components (A), (B-1) and (B-2).

In this method of preparing the organopolysiloxane composition at the same time the component (B) fluorosilicone-treated silica is formed;

from 10 to 100 parts by weight, and preferably from 20 to 50 parts by weight, of the (B-1) silica fine powder;

from 0.2 to 200 parts by weight, and preferably from 2 to 50 parts by weight, of the (B-2) silazane compound; and from 0.1 to 50 parts by weight, and preferably from 0.2 to 20 parts by weight, of the water;

are used based on 100 parts by weight of the base component organopolysiloxane.

In this preparation method, the water must be used within the above range so that the reaction between the silica fine powder and silazane compound may well take place. In particular, when a compound having a silanol group at the terminal of its molecular chain is used as the component (A) organopolysiloxane, the water may desirably be of not less than pH 6. The pH can be readily controlled using a dilute alkali of ammonia, ammonium carbonate or the like.

For the purpose of carrying out the reaction between the silica fine powder and silazane compound, the wetting agent previously described may also desirably be used in an amount of not more than 20 parts by weight based on 100 parts by weight of the organopolysiloxane.

In this preparation method also, the silazane compound having no fluorine-containing organic group may also be used in combination so long as the object of this invention may not be missed.

The reaction between the silica fine powder and silazane compound that takes place when the above respective components are mixed, proceeds in the same way as that described in the paragraph of the preparation of fluorosilicone-treated silica. Namely, the respective components are mixed in a closed atmosphere, whereupon the silanol groups on the particle surfaces of the silica fine powder react with the silazane compound to cause silylation of the silanol groups to proceed. In this instance, the reaction can be accelerated when the reaction mixture is heated to 200° C. or less, for example, about 100° C. After the reaction is completed, the reaction mixture may be heated at, for example, about 160° C. so that the ammonia, remaining water content, byproducts, unreacted silazane compound, etc. produced as a result of the reaction may be removed by evaporation. Here, it is preferred to remove the ammonia so as to remain in a concentration of not more than 50 ppm.

A concentration of more than 50 ppm, of the ammonia in the resulting reaction mixture may bring about, for example, occurrence of the structuring due to the remaining ammonia. In the instance where the (A) organopolysiloxane has a silanol group at the terminal of its molecular chain, it may also cause condensation reaction because of the catalytic effect of the ammonia. Both of these tend to result in an increase in viscosity of the resulting compositions. In the instance where the (A) organopolysiloxane has an aliphatic unsaturated group such as a vinyl group, the ammonia may cause the poisoning of platinum catalysts when the organopolysiloxane is cured by hydrosilylation reaction using a platinum catalyst, resulting in impairment of curability.

ORGANOPOLYSILOXANE COMPOSITION

In the organopolysiloxane composition of this invention, thus prepared, additives such as a cross-linking agent and a catlyst can be mixed depending on its use and types of the respective components.

For example, in the case when the resulting organopolysiloxane composition is a heat-curable rubber composition, an organic peroxide is added, followed by application of heating and pressure to effect cross-linking and curing.

In the case of an addition-curable rubber composition in which the compound containing a vinyl group is contained as the component (A) organopolysiloxane, a hydrogen polysiloxane and a trace amount of platinum catalyst can be added as a cross-linking agent and a catalyst, respectively, to effect curing at room temperature or with heating.

Also in the case of a condensation-curable rubber composition in which the compound having a silanol group at the terminal is used as the component (A) organopolysiloxane, the composition can be cured using as a cross-linking agent a polyfunctional silicon compound capable of being cross-linked with the silanol group, such as an acetoxysilane, an alkoxysilane, or a partially hydrolized product thereof.

The organopolysiloxane composition this invention provides may contain additives appropriately used according to the use, required performance, properties, and so forth, of the organopolysiloxane composition. Such additives include, for example, pigments, thermal-resistance improvers, adhesion auxiliaries, release agents, and oil-resistance improvers.

The organopolysiloxane composition of this invention comprises the above-described fluorosilicone-treated silica compounded therein, as a result of which the composition can not only suppress the pseudo-cross-linking reaction during its storage to give good storability but also have superior release properties and transparency.

EXAMPLES

This invention will be described below by giving Examples and Comparative Example. Examples 1 to 3 are examples in which the organopolysiloxane composition is prepared using the component (B) fluorosilicone-treated silica that has been previously prepared. Example 4 is an example in which the organopolysiloxane composition is prepared at the same time the component (B) fluorosilicone-treated silica is prepared.

In all Examples, the viscosity is expressed as a value at a temperature of 25° C.

PREPARATION EXAMPLE 1

In a flask, 10 g of silica fine powder (specific surface area: 200 m$^2$/g; Aerosil 200, a product of Nippon Aerosil Co., Ltd.) was charged. While the powder was stirred at room temperature, 1.0 g of deionized water was slowly dropwise added thereto. Thereafter, 9.9 g of a disilazane represented by the following formula:

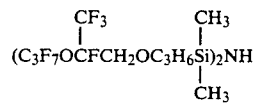

was slowly dropwise added to carry out reaction. As a result, there occurred gentle generation of heat and generation of smell of ammonia. In a closed atmosphere, the reaction mixture was stirred for 1 hour. Next, the resulting reaction mixture was aged at room temperature for 18 hours, and thereafter transferred to a porcelain enamel tray, followed by air-drying in a draft chamber for about 6 hours. Then, volatile components such as ammonia, which had been formed as by-products, were removed by heating at 150° C. for about 16 hours in a circulating hot-air oven, to give 14.3 g of white fine-powdery treated silica.

The specific surface area, carbon content and fluorine content of the resulting treated silica were measured to find that they were 105 m$^2$/g, 9.5% by weight, and 14.9% by weight, respectively. This treated silica was also put into a glass bottle together with water, which were shaked for the purpose of testing the wetting to water. As a result, the particles of the treated silica all floated on the water surface and thus were found to have water repellency.

PREPARATION EXAMPLE 2

Preparation Example 1 was repeated to give treated silica, except that a mixture comprised of 4.9 g of the disilazane as used in Preparation Example 1 and 0.9 g of hexamethyldisilazane was dropwise added as the disilazane.

The resulting treated silica was in the form of a white fine powder. The specific surface area, carbon content and fluorine content of the resulting treated silica were measured to find that they were 115 m$^2$/g, 5.3% by weight, and 7.5% by weight, respectively. The powder was also tested for the wetting to water to find that it showed water repellency.

PREPARATION EXAMPLE 3

Preparation Example 1 was repeated to give treated silica, except that the respective components were used in the following compounding formulation:

| | |
|---|---|
| Silica fine powder (specific surface area: 300 m²/g: Aerosil 300) | 100 g |
| Water | 15 g |
| Silazane compound represented by the formula: $$\begin{array}{c} CH_3 \\ | \\ (C_8F_{17}CH_2CH_2Si)_2NH \\ | \\ CH_3 \end{array}$$ | 10.2 g |
| Hexamethyldisilazane | 14.5 g |

The resulting treated silica was a white powder with water repellency.

EXAMPLES 1 and 2, COMPARATIVE EXAMPLE 1

In each example, using the treated silica obtained in Preparation Example 1 or 2, and as Comparative Example 1 treated silica prepared using only hexamethyldisilazane (specific surface area: 120 m²/g, carbon content: 3.5% by weight), respectively, a mixture having the following composition was kneaded using a triple roll mill. Dimethylpolysiloxane terminated with vinyl groups at the both ends, represented by the general formula:

| | |
|---|---|
| $$CH_2=CHSiO \overset{\underset{CH_3}{|}}{\underset{CH_3}{|}} (SiO)_{\overline{m}} \overset{\underset{CH_3}{|}}{\underset{CH_3}{|}} SiCH=CH_2$$ and having a viscosity of 5,000 cSt | 100 parts by weight |
| The treated silica | 10 parts by weight |

Platinum catalyst substantially containing no chlorine, prepared from vinyl siloxane represented by the formula:

| | |
|---|---|
| $$\begin{array}{c} CH_3 \\ | \\ (CH_2=CHSi)_2O \\ | \\ CH_3 \end{array}$$ and chloroplatinic acid (Pt concentration: 1.0% by weight; a toluene solution) | 0.5 part by weight |
| Cyclotetrasiloxane represented by the formula: [(CH_2=CH).CH_3SiO]_4 | 0.05 part by weight |

Thereafter, 2.0 parts by weight of a cross-linking agent represented by the formula:

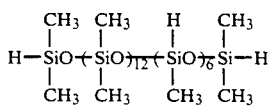

was compounded to give a composition. The transparency and viscosity of the composition thus obtained were measured and also subjected to release property tests according to the method described below. The strength of cured products was also measured. Results obtained are shown in Table 1.

Release Property Test

A composition having subjected to vacuum defoaming was coated on the mirror surface of a 5×5×0.5 cm mirror-surface metallic block put in a 7×7×1.5 cm box-shaped mold. The resulting coating was left at room temperature for 16 hours to effect curing. The block thus provided with a coating was then taken out of the mold, and the coating was further aged for 2 hours and cured to give a female mold comprised of a cured product of the composition. Into the female mold thus obtained, a resin composition comprising a bisphenol-type liquid epoxy resin mixed with a curing agent as a cross-linking agent, mainly composed of triethylenetetramine was poured and then cured at 80° C. for 30 minutes. A molded product thus obtained was separated from the mold. This operation was repeated to examine the release properties and the surface deterioration.

(i) Release Properties

Release properties of the female mold prepared using the composition obtained in each example were evaluated based on the following criterions:

A: Little resisting when the cured molded product is separated from the mold.
B: Intermediary between A and C.
C: A little resisting when the cured molded product is separated from the mold.

(ii) Release Durability

In view of the fact that gloss of a molded product is lowered with deterioration of the surface of the rubber female mold, the operation to separate the molded product from the mold was repeated until the gloss on the surface of the molded product was lowered. The durability is indicated by how many times the operation has been repeated.

Strength of Cured Product

The composition was put in a mold of 12×15×0.3 cm, the top surface of which was smoothed with a plate made of stainless steel, and the composition was left at room temperature for 16 hours to effect curing. Thereafter, the molded product was taken out of the mold, and further aged for 2 days and cured to give a molded sheet. Hardness, elongation, and tensile strength of this molded sheet were measured according to JIS K6301. Specific gravity was also measured.

TABLE 1

| | Example 1 | Example 2 | Comparative Example 1 |
|---|---|---|---|
| Condition of compositions: | (1) | (2) | (3) |
| Release property test: | | | |
| Release properties: | A | A to B | C |
| Release durability: | Surface gloss deteriorated at 18 to 20 times | Surface gloss deteriorated at 18 to 20 times | Considerably deteriorated at 15 to 16 times |
| Strength of cured product: | | | |
| Hardness: | 24 | 25 | 26 |
| Elongation (%) | 264 | 270 | 284 |
| Tensile strength: (kg/cm²) | 6.5 | 10.5 | 13.5 |

TABLE 1-continued

|  | Example 1 | Example 2 | Comparative Example 1 |
|---|---|---|---|
| Specific gravity (25° C.): | 1.01 | 1.01 | 1.01 |

(1): A transparent, non-fluid paste.
(2): A non-fluid paste with less transparency than that of Example 1.
(3): A translucent fluid with a viscosity of 15,000 cP.

The above results show that the silicone rubber composition in which the fluorosilicone-treated silica of this invention is added gives a cured product with slightly poorer rubber strength, but superior release properties and release durability.

EXAMPLE 3

According to the following compounding formulation, a composition was prepared by kneading the components, using a triple roll mill.

| | |
|---|---|
| The same dimethylpolysiloxane as used in Example 1 | 100 parts by weight |
| The treated silica prepared in Preparation Example 3 | 15 parts by weight |
| The same platinum catalyst as used in Example 2 | 0.2 part by weight |
| The same cyclotetrasiloxane as used in Example 2 | 0.1 part by weight |

The resulting composition was in the form of a paste with fluidity.

In 115.3 parts by weight of this composition, 2.15 parts by weight of the same cross-linking agent as used in Example 2 was added, and these were kneaded, followed by vacuum defoaming. The resulting kneaded product was poured into a mold, and press-molded at 115° C. for 10 minutes to form a sheet of 10×12×0.2 cm. This sheet was post-cured at 150° C. for 1 hour, and thereafter the mechanical strength of the cured product was measured according to JIS K6301. Results obtained are shown below.

Hardness: 31.
Elongation: 411%.
Tensile strength: 36.3 kg/cm².

EXAMPLE 4

In a kneader, 100 g of silanol-terminated dimethylpolysiloxane (viscosity: 20,000 cSt), 5.4 g of disilazane represented by the formula:

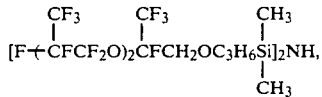

14 g of hexamethyldisilazane and 6 g of deionized water were charged, and stirred for 5 minutes to carry out mixing. Thereafter, 46 g of fumed silica (specific surface area: 300 m²/g; Aerosil 300, a product of Nippon Aerosil Co., Ltd.) was added, and mixed in a closed atmosphere. There occurred generation of heat and ammonia gas. Subsequently the mixing was continued for 1 hour with heating at 100° C., and thereafter, while nitrogen gas was fed in a small quantity, the mixture was stirred for about 3 hours with heating at 150° C. under reduced pressure of 700 mm Hg. The smell of ammonia was confirmed to have gone. Thereafter, the reaction mixture was cooled to 100° C. or lower, and 50 g of the same silanol-terminated dimethylpolysiloxane as used in the above was further added and mixed, and then 40 g of trimethylsoloxy-terminated dimethylpolysiloxane (viscosity: 30 cSt) and 10 g of silanol-terminated dimethylpolysiloxane (viscosity: 30 cSt) were added and mixed. The mixture was kneaded using a triple roll mill, and thus the end composition was obtained.

The concentration of ammonia remaining in the composition thus obtained was measured to reveal that it was 12 ppm. The initial viscosity and the viscosity after aging at 150° C. for 2 hours were also measured to reveal that they were 3,000 poises and 3,240 poises, respectively.

A compound with the following compounding formulation was also prepared, which was left at 25° C. for 72 hours to effect curing.

| | |
|---|---|
| The composition obtained in the above | 100 g |
| (n-C₃H₇O)₄Si | 3 g |
| (C₄H₉)₂Sn(OCOC₁₁H₂₃)₂ | 0.5 g |

The mechanical strength of the resulting cured product gave the following results.
Hardness: 27.
Elongation: 410%.
Tensile strength: 38 kg/cm².
Tear strength (JIS A): 21 kg/cm.

We claim:
1. An organopolysiloxane composition comprising:
(A) an organopolysiloxane represented by the general formula (I):

wherein $R^1$ represents a monovalent hydrocarbon group having 1 to 10 carbon atoms and containing no fluorine atom; a is a numeral of 1.90 to 3.0, and b is a numeral of 0 to 1.0, provided that a + b is 1.90 to 3.0, and
(B) a fluorosilicone-treated silica;
wherein said (B) fluorosilicone-treated silica is obtained by reacting:
(B-1) a silica fine powder of not less than 50 m²/g in specific surface area with
(B-2) a silazane compound of not more than 3,000 in molecular weight, containing a group represented by the following formula (II):

wherein Rf represents a fluorine-containing organic group having a perfluoroalkyl ether group; $R^2$ represents a monovalent hydrocarbon group having 1 to 10 carbon atoms and containing no fluorine atom; $R^3$ represents a divalent hydrocarbon group having 2 to 10 carbon atoms; and c is an integer of 0, 1 or 2.

2. The organopolysiloxane composition of claim 1, wherein said (B) fluorosilicone-treated silica is compounded in an amount of from 1 to 100 parts by weight based on 100 parts by weight of said (A) organopolysiloxane.

3. The organopolysiloxane composition of claim 1, wherein the group Rf in said formula (II) represents a fluorine-containing organic group having 3 to 15 carbon atoms and containing a perfluoroalkyl ether group represented by the following formula:

$$F-(-C_qF_{2q}O-)_n- \qquad (5)$$

wherein q is an integer of 1 to 3, and n is an integer of 1 to 4.

4. The organopolysiloxane composition of claim 1, wherein the group Rf in said Formula (II) is a group represented by the following formula:

$$C_mF_{2m+1}(CH_2)_rO-$$

wherein m is an integer of 1 to 3, and r is an integer of 0 to 2.

5. The organopolysiloxane composition of claim 1, wherein the group Rf in said Formula (II) is a group represented by the following formula:

$$F(\underset{CF_3}{CFCF_2O})_n\underset{CF_3}{CFCH_2O-}$$

wherein n is an integer of 1 to 4.

6. A process for preparting an organopolysiloxane composition comprising the step of mixing or kneading:

(A) an organopolysiloxane represented by the general formula (I):

$$R_a^1(OH)_bSiO_{\frac{4-a-b}{2}} \qquad (I)$$

wherein $R^1$ represents a monovalent hydrocarbon group having 1 to 10 carbon atoms and containing no fluorine atom; a is a numeral of 1.90 to 3.0, and b is a numeral of 0 to 1.0, provided that a + b is 1.90 to 3.0, (B-1) a silica fine powder of not less than 50 m²/g in specific surface area;

(B-2) a silazane compound of not more than 3,000 in molecular weight, containing a group represented by the following formula (II):

$$\underset{Rf-R^3-Si-}{(R^2)_c} \qquad (II)$$

wherein Rf represents a fluorine-containing organic group having a perfluoroalkyl ether group; $R^2$ represents a monovalent hydrocarbon group having 1 to 10 carbon atoms and containing no fluorine atom; $R^3$ represents a divalent hydrocarbon group having 2 to 10 carbon atoms; and c is an integer of 0, 1 or 2; and (C) water.

7. The process of claim 6, wherein from 10 to 100 parts by weight of said (B-1) silica fine powder, from 0.2 to 200 parts by weight of said (B-2) silazane compound, and from 0.1 to 50 parts by weight of said (C) water are used, based on 100 parts by weight of said (A) organopolysiloxane.

8. The process of claim 7, wherein said components (A) to (C) are mixed or kneaded together with a wetting agent in an amount of not more than 20 parts by weight based on 100 parts by weight of the (A) organopolysiloxane.

9. A process for preparing a fluorosilicone-treated silica, comprising the step of reacting:

(B-1) a silica fine powder of not less than 50 m²/g in specific surface area with (B-2) a silazane compound of not more than 3,000 in molecular weight, containing a group represented by the following formula (II):

$$\underset{Rf-R^3-Si-}{(R^2)_c} \qquad (II)$$

wherein Rf represents a fluorine-containing organic group having a perfluoroalkyl ether group; $R^2$ represents a monovalent hydrocarbon group having 1 to 10 carbon atoms and containing no fluorine atom; $R^3$ represents a divalent hydrocarbon group having 2 to 10 carbon atoms; and c is an integer of 0, 1 or 2.

10. The process of claim 9, wherein said (B-2) silazane compound is mixed in an amount of from 1 to 200 parts by weight based on 100 parts by weight of said (B-1) silica fine powder.

11. The process of claim 10, wherein said (B-1) silica fine powder and (B-2) silazane compound are mixed together with water in an amount of not more than 50 parts by weight per 100 parts by weight of said (B-1) silica fine powder.

12. The process of claim 10, wherein said components (B-1) and (B-2) are mixed together with a wetting agent in an amount of not more than 30 parts by weight per 100 parts by weight of said (B-1) silica fine powder.

* * * * *